(12) United States Patent
Haskew (10) Patent No.: US 6,776,606 B2
(45) Date of Patent: Aug. 17, 2004

(54) METHOD FOR OXIDIZING MIXTURES (75) Inventor: James W. Haskew, Joplin, MO (US)

(73) Assignee: Emmissions Technology, LLC, Phoenix, AZ (US)

( * ) Notice: Subject to any disclaimer, the term of this patent is extended or adjusted under 35 U.S.C. 154(b) by 167 days.

(21) Appl. No.: 10/087,139

(22) Filed: Mar. 1, 2002

(65) Prior Publication Data

US 2002/0165088 A1 Nov. 7, 2002

Related U.S. Application Data (60) Provisional application No. 60/273,283, filed on Mar. 2, 2001, and provisional application No. 60/355,773, filed on Feb. 9, 2002.

(51) Int. Cl.$^7$ .................................................. B01J 8/00
(52) U.S. Cl. ........................... 431/2; 110/346; 110/347; 431/7; 431/8; 431/9; 423/245.3
(58) Field of Search ....................... 423/245.3; 110/346, 110/347; 431/2, 7, 8, 9

(56) References Cited

U.S. PATENT DOCUMENTS

| | | |
|---|---|---|
| 2,086,775 A | 7/1937 | Lyons et al. |
| 3,615,836 A | 10/1971 | Batzold |
| 3,800,768 A | 4/1974 | Rhodes et al. |
| 3,862,819 A | 1/1975 | Wentworth, Jr. |
| 3,929,118 A | 12/1975 | Leong |
| 3,940,923 A | 3/1976 | Pfefferle |
| 4,090,838 A | 5/1978 | Schena et al. |
| 4,170,200 A | 10/1979 | Takeuchi et al. |
| 4,235,754 A | 11/1980 | Chester |
| 4,295,816 A | 10/1981 | Robinson |
| 4,410,467 A | 10/1983 | Wentworth, Jr. |
| 4,440,874 A | 4/1984 | Thompson |
| 4,475,483 A | 10/1984 | Robinson |
| 4,493,637 A | 1/1985 | Ganter et al. |
| 4,538,981 A | 9/1985 | Venturini |
| 4,629,472 A | 12/1986 | Haney, III et al. |
| 4,725,222 A | 2/1988 | Koch |
| 4,725,226 A | 2/1988 | Balsiger et al. |
| 4,802,335 A | 2/1989 | Bidwell |
| 5,085,841 A | 2/1992 | Robinson |
| 5,283,052 A | 2/1994 | Hums |
| 5,331,924 A | 7/1994 | Kraus |
| 5,386,690 A | 2/1995 | Shustorovich et al. |
| 5,501,714 A | 3/1996 | Valentine et al. |
| 5,558,513 A | 9/1996 | Wentworth, Jr. |
| 5,604,980 A | 2/1997 | Shustrovich et al. |
| 5,785,930 A | 7/1998 | Sinclair |
| 5,851,498 A | 12/1998 | Rozenshtein et al. |

(List continued on next page.)

OTHER PUBLICATIONS

Proceedings of the $7^{th}$ US Mine Ventilation Symposium, Society for Mining, Jun. 5–7, 1995; pp. 95–98.

Simultaneous Reduction of Soot and Nox in Diesel Engines by Homogeneous Catalysis of Group Platinum Metals, SAE Technical Paper Series, Aug. 7–10, 1989; pp. 1–11.

Primary Examiner—Stanley S. Silverman
Assistant Examiner—Maribel Medina
(74) Attorney, Agent, or Firm—Schmeiser, Olsen & Watts, LLP (57) ABSTRACT

A catalyst composition and method for oxidizing fuels is disclosed. The catalyst composition comprises at least one compound having one of a group III, group IIA or Lanthanide element such as, for example, Aluminum, Magnesium or Cesium, and at least one compound having at least one element selected from group IA, group IVA, group VI, group VII, group VIII, group IB, group IIB, and combinations thereof, such as, for example platinum, rhodium and rhenium. A method for oxidizing an fuel, the method comprising providing a fuel and a catalyst mixture; transporting the fuel and the catalyst to the flame zone separately; mixing the fuel and the catalyst; and oxidizing the fuel. The method and catalyst mixture may be used for oxidation of any hydrocarbon based fuel. Improved results from the use of the group III, group IIA or Lanthanide group element include increased power, reduced harmful emissions, and smoother oxidation process.

50 Claims, 3 Drawing Sheets

U.S. PATENT DOCUMENTS

| | | |
|---|---|---|
| 5,924,280 A | 7/1999 | Tarabulski |
| 5,968,464 A | 10/1999 | Peter-Hoblyn et al. |
| 5,976,475 A | 11/1999 | Peter-Hoblyn et al. |
| 6,013,599 A | 1/2000 | Manson |
| 6,129,897 A | 10/2000 | Neelakantan |
| 6,176,701 B1 | 1/2001 | Robinson |
| 6,180,081 B1 | 1/2001 | Poschmann et al. |
| 6,419,477 B1 | 7/2002 | Robinson |

METHOD FOR OXIDIZING MIXTURES

This application is related to U.S. Provisional Patent Application Serial No. 60/273,283, filed on Mar. 2, 2001, entitled "POLY-FUNCTIONAL LIQUID CATALYST" and U.S. Provisional Patent Application Serial No. 60/355,773, filed on Feb. 9, 2002, entitled "CATALYST COMPOSITION AND METHOD FOR OXIDIZING MIXTURES". The disclosure of these related applications are incorporated herein by this reference.

BACKGROUND OF THE INVENTION

1. Technical Field

The present invention generally relates to a composition and method for catalyzing oxidation, and more particularly to a catalyst mixture and method for conveying a catalyst for oxidation of a fuel.

2. Background Art

Bubbling or sparging air through a catalytic mixture that includes platinum, rhodium and rhenium compounds has been used to convey the platinum, rhodium and rhenium compounds into a combustion chamber of, for example, an automobile engine, to reduce pollution from the engine. The use and operation of catalysts in oxidation processes are generally known in the art for increasing the efficiency of the oxidation process and in particular cases, reducing pollution. Greater efficiencies and reduction of pollution is needed.

Furthermore, dispersed particles in catalyst mixtures have been found to agglomerate due to heat or complexation with organic additives in the catalytic mixture. There is a need to prevent agglomeration of the dispersed particles since agglomerated particles are more difficult to convey out of the catalytic mixture by a stream of air at least in part because they are heavier than non-agglomerated particles.

Accordingly, there is a need for a catalyst composition and method for oxidizing a fuel that prevents agglomeration of the dispersed particles in the catalyst mixture, reduces pollution emissions and increases power generated by fuel oxidation.

DISCLOSURE OF THE INVENTION

The present invention relates to a method for oxidizing fuel through the use of a catalyst mixture which is added to a flame zone of an oxidation process. The composition and methods of the present invention may provide a way to increase the efficiency of fuel oxidation, resulting in reduced harmful emissions, greater horsepower and more stable burning, which tends to result in less wear and tear on the engine. Embodiments of the invention generate a catalyst-containing environment within the flame zone by sparging gas through a catalyst mixture and transporting the resulting gas, which contains catalyst particles, to the flame zone to affect the chemistry of the oxidation process. The catalyst particles may be directly injected into the flame zone or may be indirectly injected or drawn into the flame zone, such as through an air intake to the flame zone. Ionized sparging gas may improve the results even further.

Embodiments of the catalyst mixture include at least one compound having elements selected from the group consisting of group IA, group IIIA, group VIA, group VA, group VI, group VII, group VIII, group IVA, group IB, group IIB and combinations thereof, and at least one compound having at least one element selected from the group consisting of group III, group IIA and Lanthanide group, such as Aluminum, Magnesium or Cerium, mixed in a matrix, such as water. Additionally, the catalyst mixture may include one or more of a sorbent, an antifreeze agent, and a surfactant. It has been found that the pH of the catalyst mixture is crucial to prevent agglomeration of the catalyst. Agglomeration reduces the amount of catalyst particles which may be carried to the flame zone in an air stream and may cause portions of the catalyst mixture to fall out of suspension.

Tests performed on diesel engines which use catalyst particles of embodiments of the invention within their engine combustion chambers have been found to generate more power using the same fuel, experience less vibration and produce fewer harmful emissions than the same diesel engines run without the catalyst particles. Many of the advantages experienced by the addition of the catalyst particles continue for a time even after the catalyst particles are no longer being conveyed to the flame zone. Embodiments of the invention are applicable to any oxidation process including, but not limited to, oxidation processes in the fields of boilers, furnaces, turbine engines, reciprocating engines, incinerators, open flames, and any other process where hydrocarbon fuels are oxidized.

DETAILED DESCRIPTION OF EMBODIMENTS OF THE INVENTION

The present invention discloses a method and composition for catalyzing oxidation of a fuel by combining catalyst particles with a fuel in a flame zone. As used herein, a flame zone means and includes an area where oxidation of a fuel occurs and the area immediately surrounding that area. For example, for a reciprocating engine, and many other combustion processes, the flame zone is the area within the combustion chamber. For an incinerator, furnace or boiler, where a flame is burning for extended periods of time rather than in short bursts, the flame zone is the area within and directly surrounding the flame, the chemistry environment of which affects the oxidation process. The catalyst particles may be conveyed to the flame zone by sparging a stream of gas, such as air, through a catalyst mixture so that catalyst particles may be carried in the gas stream to the flame zone.

Embodiments of the invention may be used in the flame zones of either open flame or enclosed flame oxidation applications. An open flame oxidation is one in which the expansion of gasses is used for heat, heating, incinerating and/or to soften, mix, burn and/or melt a substance. Examples of open flame oxidation applications may include, without limitation, furnaces and incinerators. An enclosed flame oxidation is one in which the expansion of gasses is directly used for work such as moving a piston in an engine. Examples of enclosed flame oxidation applications may include, without limitation, turbines and reciprocating engines. The invention is useful in all oxidation processes.

Figure 1:
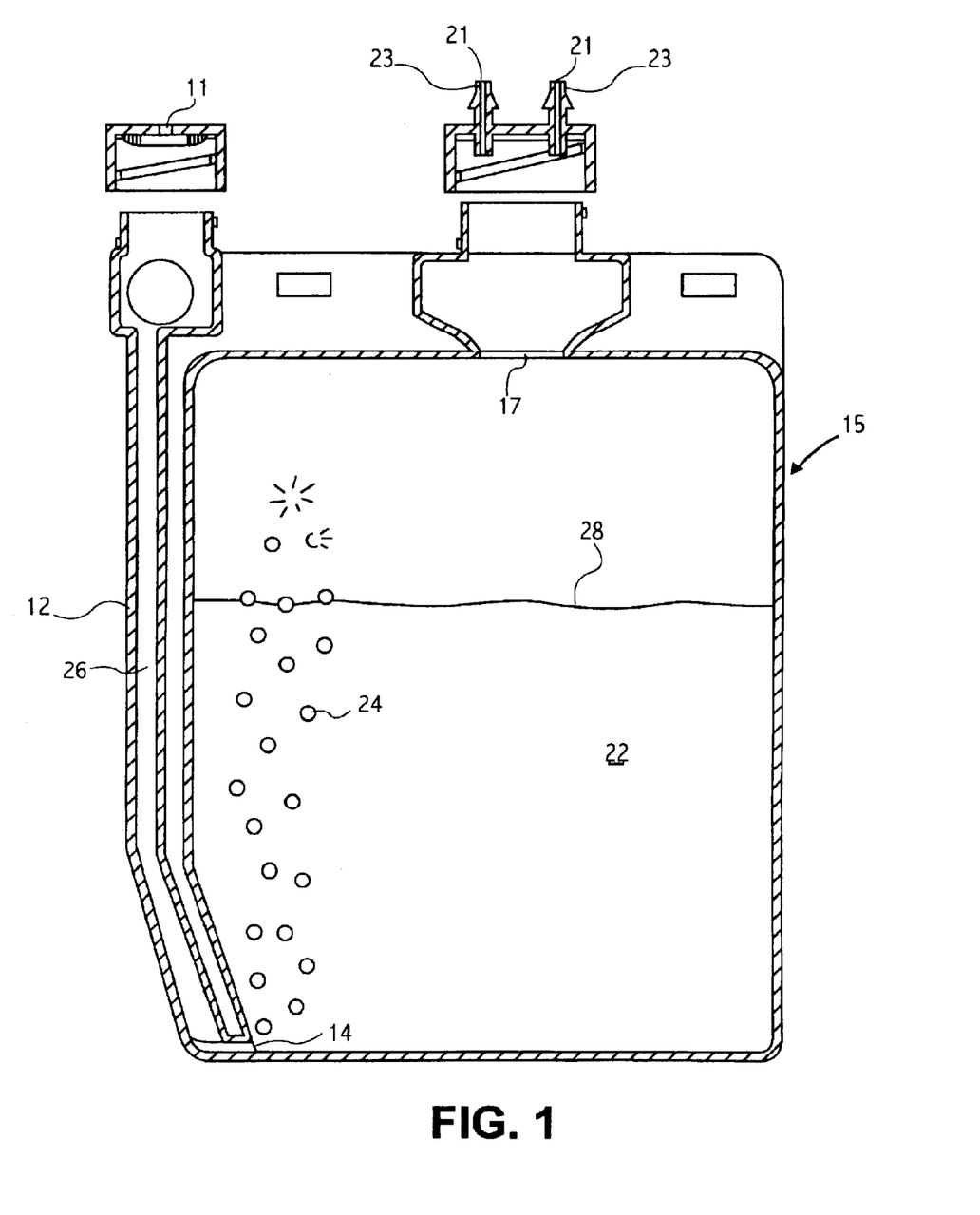
FIG. 1 depicts an example of an apparatus for conveying the catalyst of the present invention to a combustion chamber, in accordance with embodiments of the present invention.

In accordance with embodiments of the present invention, FIG. 1 depicts a front cross-sectional view of catalyst chamber 15 for sparging a catalyst mixture 22. The catalyst chamber includes a sparging tube operatively coupled to an air inlet 14 to the catalyst chamber 15. Alternatively, the sparging tube could be a hose coupled to the air inlet 14. "Sparging" or "bubbling a gas through a mixture for use in an oxidation process involves passing a stream of gas through a mixture such that dispersed particles in the mixture may be non-evaporatively or mechanically/physically fluidized and carried to an oxidation flame zone by a gas stream. "Fluidized bed" is a term conventionally applied to passing a gas through a powdered solid such that the originally static powder develops fluid properties such as becoming flowable. In the context of the present invention, sparging a gas through the liquid catalyst mixture 22 non-evaporatively or mechanically removes otherwise non-volatile solid catalyst particles from the liquid mixture 22, such that the particles become flowable or fluidized when placed into the gas stream above the liquid catalyst mixture 22, through the popping of the bubbles 24 at the surface of the liquid catalyst mixture 22. In this fluidized state, the catalyst particles may be carried to the flame zone by the gas stream.

In operation, air passes through the sparging tube 12 into the catalyst chamber 15 in the direction of arrow 26 resulting in bubbles 24 passing through the catalyst mixture 22. An outlet 17 to the catalyst chamber 15 operatively couples to transfer lines 23. Although two transfer lines 23 are shown in the embodiment of FIG. 1, only one or more than two may be used. The sparging gas may be moved in the direction of the arrow 26 by applying a vacuum to an opening 21 of a transfer line 23. Alternatively, the sparging gas may be moved in the direction of the arrow 26 by supplying a sparging gas under a positive pressure to the inlet 11 of the sparging tube 12. A bubble rate based on counting the number of bubbles per second released from the sparging tube 12 may be controlled by adjusting either the vacuum applied to the opening 21 of the transfer lines 23, by adjusting the pressure supplied at the sparging tube 12, or by incorporating an appropriate restriction or restrictor in the transfer line 23. In embodiments of the present invention, the bubble rate may be from about 2 to about 15 bubbles per second. The sparging gas may be air, nitrogen, argon, helium and combinations thereof, although other gases may be used.

Alternatively, the sparging gas may be a positively or negatively ionized gas, for example, selected from air, nitrogen, argon, helium and combinations thereof. The ionized sparging gas may be formed by exposing the sparging gas to ions from an ionizer, such as that available from All Electronics Corp., Van Nuys, Calif. 91408. The ionized sparging gas may be passed through the sparging tube 12 and catalyst mixture 22 to the transfer lines 23 as described above. Though not intending to be bound by this theory, it is believed that the charged ions in the sparging gas may attract charged ions in the catalyst mixture 22 based on the natural attraction of positively and negatively charged ions. The natural attraction of the charged sparging gas and the charged catalyst ions may increase the efficiency of removal of the catalyst ions from the catalyst mixture 22 by the ionized sparging gas, compared to the removal of the catalyst ions by the electrically neutral sparging gas. By sparging with ionized sparging gas, the efficiency of removal of the catalyst ions from the catalyst mixture 22 may be increased. Use of ionized sparging gas may also result in a reduction in the amount of the catalyst used by the process and required for the advantages of the invention. Use of ionized sparging gas may result in an increase in the amount of catalyst ions conveyed to a flame zone of an oxidation process compared to the amount of catalyst ions removed from the catalyst mixture 22 with an electrically neutral sparging gas.

For embodiments of the present invention, the catalyst mixture used in the sparging process includes at least one catalyst compound which contains at least one group III or group IIA element in a matrix such as water. The water is preferably pure with as few contaminants as possible. Distilled water may be used. In one specific embodiment of the invention, the catalyst mixture includes a catalyst compound containing Aluminum. A non-limiting example of an Aluminum catalyst compound which may be used is $AlO_3$. In another specific embodiment of the invention, the catalyst mixture includes a catalyst compound containing Magnesium. A non-limiting example of a Magnesium catalyst compound which may be used is $MgCl_2$.

Additionally, the catalyst mixture may include one or more other catalyst compounds which contain one or more elements from group IA, group IIIA, group VIA, group VA, group VI, group VII, group VIII, group IVA, group IB, group IIB and combinations thereof. For example, and without limitation, the catalyst compound may be a platinum (Pt) compound, a rhodium (Rh) compound, a rhenium (Re) compound, a lithium (Li) compound, a potassium (K) compound, a sodium (Na) compound, an iron (Fe) compound, a molybdenum (Mo) compound, a manganese (Mn) compound, a copper (Cu) compound, a gold (Au) compound or a silver (Ag) compound. In embodiments including Platinum, the Platinum compound may be a water soluble form of Platinum such as chloroplatinic acid ($H_2PtCl_6.6H_2O$). In embodiments including Rhodium, the Rhodium compound may be a water soluble form of Rh such as rhodium chloride ($RhCl_3$). In embodiments including Rhenium, the Rhenium compound may be a water soluble form of Rhenium such as perrhenic acid ($HReO_4$). Alternatively, the Rhenium compound may be selected from the group including metaperrhenates, Rhenium carbonyl halides, and salts of $HReO_4$. In embodiments including Iron, the Iron compound may be ferrocene.

In specific embodiments of the invention, a catalyst mixture including Aluminum as the group III element and Platinum, Rhodium and Rhenium as group VIII elements is used. With these catalysts in the mixture, a concentration of Platinum, as $H_2PtCl_6.6H_2O$ in the catalyst mixture, may be at least about 0.6 mg/ml, a concentration of Rhodium, as $RhCl_3$ in the catalyst mixture, may be at least about 0.07 mg/ml, a concentration of Rhenium, as $HReO_4$ (perrhenic acid) in the catalyst mixture, may be at least about 0.1 mg/ml, a concentration of Aluminum, as $AlCl_3$ in the catalyst mixture, may be at least about 0.07 mg/ml. In another specific embodiment, Magnesium as a group IIB element is substituted for Aluminum in the catalyst mixture, and a concentration of Magnesium, as $MgCl_2$ in the catalyst mixture, may be at least about 0.07 mg/ml. It is contemplated that in certain embodiments of the invention, only a portion of the Aluminum is replaced by Magnesium so that the catalyst mixture includes both Aluminum and Magnesium.

The specific proportions of each of the various catalyst components are related to how well the catalyst particles will work in achieving the various advantages of the invention. In a specific embodiment of the invention, the ratio of Platinum to Rhodium is about 8.6 to 1, the ratio of Platinum to Rhenium is about 6 to 1 and the ratio of Platinum to Aluminum is about 8.6 to 1. In an embodiment where Magnesium is substituted for Aluminum, the ratio of Platinum to Magnesium is about 8.6 to 1. Nevertheless, it is believed that the ratios of each of the other catalyst components to Platinum may be much higher and lower than is used in this specific embodiment. For example, it is believed that the ratios of Platinum to Rhenium and Platinum to Aluminum or Magnesium may each individually range from between 30 to 1 and 1 to 1, and more specifically from between 15 to 1 and 2 to 1, and that ratios of Platinum to Rhodium may range from between 30 to 1 and 4 to 1, and more specifically between 15 to 1 and 4 to 1. The actual maximum and minimum workable ranges have not been researched fully.

It should also be understood that in embodiments of the invention, the use of only Platinum and one other component (i.e. Rhodium, Rhenium or Magnesium or Aluminum), will similarly provide some benefit to the oxidation process. Even operating the catalyst system without Platinum shows some improvement over oxidation processes without a catalyst.

It has been theorized that the group III element described as part of a compound within the catalyst mixture above, particularly Aluminum, may be acting as a sorbent for the catalyst mixture. An appropriate sorbent in the catalyst mixture may cause a catalyst component to be adsorbed or absorbed to the sorbent. This may assist in transferring the catalyst to the sparging gas stream through preventing the catalyst from bonding with other elements. This may also assist in reducing agglomeration of catalyst components. Both reduction of agglomeration and prevention of catalyst components bonding with each other is desirable because more catalyst particles would reach the flame zone and thereby increase the catalyst effectiveness. Alternatively, or additionally, it has been theorized that the group III element, for example Aluminum, or group IIA element, for example Magnesium, acts as an accelerant within the flame zone to enable the fuel to oxidize at a lower temperature and for a longer time. As part of this second theory, it is believed that placing a group III or group IIA element into the flame zone, particularly Aluminum, creates a more electrically conductive environment within the flame zone, enabling oxidation to occur more quickly. With faster oxidation of the fuel, more of the fuel burns resulting in fewer emissions, more power output and lower burn temperature. If serving this function, the group III or group IIA element would be acting as an accelerant for the oxidation process. Whether the group III or group IIA element, and particularly Aluminum or Magnesium, added to the catalyst mixture functions as a sorbent, an accelerant, or serves some other function, it is clear from test results that inclusion of the group III or group IIA element in the catalyst mixture provides a significant advantage to the oxidation process.

Optionally, embodiments of the catalyst mixture, such as the catalyst mixture 22 shown in the catalyst chamber 15 of FIG. 1, may include other components such as one or more sorbents, one or more antifreeze agents, one or more pH adjusters/buffers and one or more surfactants as described more fully below.

Examples of sorbent compounds which may be added to the catalyst mixture in embodiments of the present invention include sorbent compounds containing a group III element such as Aluminum (Al) or a Lanthanide group element such as Cerium (Ce). It is believed that in particular embodiments of the invention, a Lanthanide group element, such as Cerium, may be added in the catalyst mixture in place of the group III element. One particular example of such a catalyst mixture may include, without limitation, a catalyst mixture comprising at least Platinum, Rhodium, Rhenium and Cerium as catalysts. The group III or Lanthanide sorbent may be added to the catalyst mixture as a precursor material such as, without limitation, $AlCl_3$, $Al(NO_3)_3$, $CeCl_3$ or $Ce(NO_3)_3$ which forms sorbent particles when the sorbent precursor material reacts with water in the catalyst mixture. The sorbent precursor materials such as $AlCl_3$, $Al(NO_3)_3$, $CeCl_3$ or $Ce(NO_3)_3$ are particularly useful because they tend to form finely divided and easily dispersed sorbent materials in the catalyst mixture. Sorbent materials for example, may include alumina ($Al_2O_3$), which is formed when $AlCl_3$ or $Al(NO_3)_3$ reacts with water. Sorbent materials may also include ceria ($CeO_2$ or $Ce_2O_3$) which is formed when $CeCl_3$ or $Ce(NO_3)_3$ reacts with water. When the catalyst mixture contains a sorbent material, the catalyst compound may be adsorbed or absorbed on the sorbent material as described above. In a particular embodiment of the invention, the sorbent may comprise both alumina and ceria.

Examples of antifreeze agents which may be added to the catalyst mixture in embodiments of the invention may include antifreeze agents containing an alcohol such as ethylene glycol, propylene glycol, methanol, ethanol, propanol, butanol, pentanol, hexanol, isopropy alcohol, isobutyl alcohol and combinations thereof.

Examples of surfactants which may be added to the catalyst mixture in embodiments of the invention may include ethylene glycol, other glycols, silicone oil, detergents and combinations thereof. Surfactants reduce foaming of the catalyst mixture in the catalyst chamber, caused when the bubbles break the surface of the catalyst mixture. This allows the catalyst particles to more easily be transferred to the atmosphere above the surface of the catalyst mixture and be carried away by the gas stream.

Figure 2:
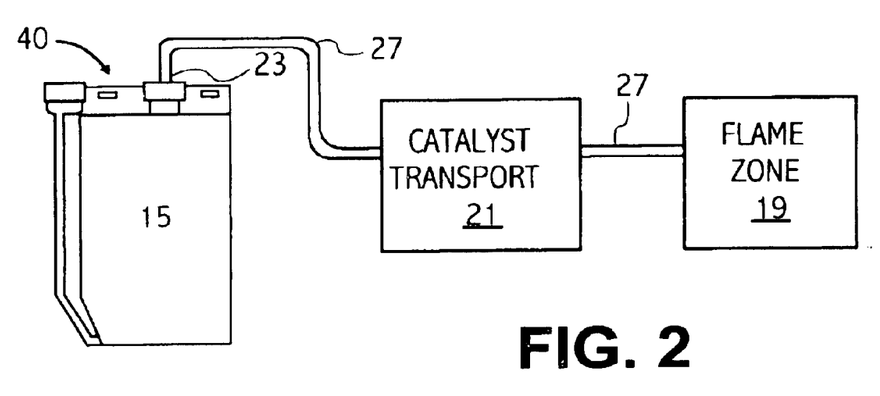
FIG. 2 depicts an embodiment of a system having a catalyst chamber for producing a gas stream containing catalyst particles, a catalyst transport and a flame zone.

The pH of the catalyst mixture composition of embodiments of the invention, including the catalyst compound(s), any sorbent, antifreeze agent and/or surfactant, should be such that agglomeration of particles is substantially avoided. Agglomerated particles are undesirable because agglomerated particles are more difficult to convey out of the catalytic mixture by the stream of air, at least in part because they are heavier than non-agglomerated particles. It has been found that for the compositions of the catalyst mixtures of embodiments of the invention, a pH of less than about 4.0 is desirable for its efficacy in preventing formation of agglomerated particles. Above a pH of about 4.0, the catalyst components were shown to agglomerate within the catalyst chamber. In a specific embodiment of the invention, a pH in a range of about 1.4 to about 3.0 is used. In a more specific embodiment of the invention, a pH of between about 1.6 to about 2.2 is used. The pH of the catalyst mixture may be adjusted by adding appropriate amounts of an acid and/or a base. The pH of the catalyst mixture may also be adjusted by using an appropriate buffer such as tris (hydroxymethyl) aminomethane and citric acid monohydrate buffers. Examples of other compounds known to be useful in discouraging agglomeration are lithium chloride (LiCl), sodium chloride (NaCl), and HCl.

FIG. 2 depicts a catalyst delivery system 40 for transporting catalyst particles to a flame zone 19 of an oxidation process. The flame zone 19 may be an enclosed flame zone or an open flame zone. The catalyst particles sparged from the catalyst mixture within the catalyst chamber 15 are transported to the flame zone 19 by a catalyst transport 21. The catalyst transport 21 may be as simple as a tube coupled to an air intake to the flame zone 19, or may include one or more of the following to direct, regulate, monitor and control flow of the catalyst particles to the flame zone 19: pumps, injectors, restrictors, orifices controllers, regulators and other components.

The catalyst particles are transported from the catalyst chamber 15 to the flame zone 19 by the sparging gas stream through transport line 27. Alternatively, the catalyst mixture or catalyst particles may be directly injected into line 27 and swept by the sparging gas to the flame zone 19. Alternatively, a combustion air and/or inert gas feed line(s) 27 may be operatively attached to the transfer line 23 to sweep the sparging gas or a directly injected catalyst mixture into the flame zone 19. The combustion air may be provided, for example, by forced air induction.

In a particular embodiment for use of the invention in an oxidation process for an open flame application for a furnace, wherein a flame is placed under a heat exchanger to transfer heat from the flame to a heat storage device such as a boiler, the catalyst particles are delivered to the flame zone 19 and are mixed with the combustion air to affect the chemical environment of the flame zone for oxidizing fuel. In another particular embodiment for use of the invention in an oxidation process for an open flame application for an incinerator, wherein oxidizable waste is burned, the catalyst particles are delivered to the flame zone 19 of the incinerator to affect the chemical environment within the flame zone.

Similar explanations may be used for embodiments of the invention involving flame zones 19, for example and without limitation, of an internal combustion engine such as, for example, a rotary engine, a gasoline engine, a diesel engine, a turbine engine, natural gas and other alternative fuel engines, or other applications such as a furnace, an incinerator, a boilers and other open flame applications using any fuel. It has been determined that sparging the catalyst particles out of the catalyst mixture of embodiments of the present invention into the flame zone 19 or direct injection of the catalyst mixture into the flame zone 19 decreases air pollution typically associated with oxidation processes in the form of reduced carbon monoxide, reduced carbon particulates, and $NO_x$, where x equals 1 or 2. The invention is also believed to reduce Sulfur Oxide emissions, such as $SO_x$ where x equals 2 or 3. Additional catalysts, such as ferrocene, may be added and are known to specifically reduce SOx emissions. Nonlimiting examples of the fuel with which the catalyst mixtures of embodiments of the invention may be used are number 2 fuel oil, fuel oils refined from crude oil, diesel fuel, gasoline, compressed or liquefied natural gas, gasohol, any hydrocarbon having one or more carbon atoms such as methane, ethane, propane, butane, isobutane, toluene, xylene, octane, benzene, mixtures of alcohols having methanol, ethanol, propanol, butanol, isopropanol, isobutanol, pentanol, hexanol, heptanol, octanol, vegetable oil such as corn oil, mineral oil, coal, coal gas, asphalt vapor, oxidizable vapors from chemical processes, wood, paper and combinations thereof.

Figure 3:
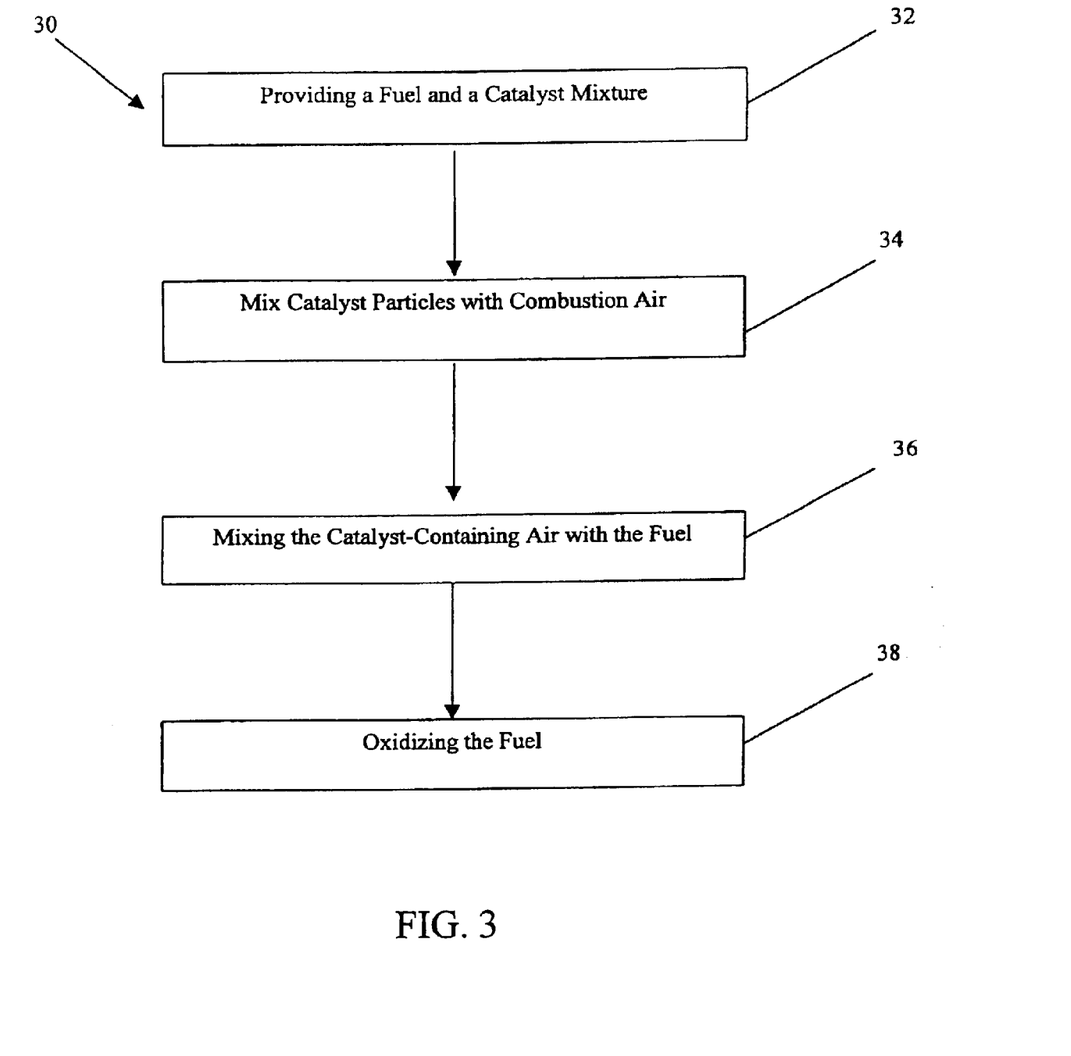
FIG. 3 depicts a method for oxidizing a fuel.

FIG. 3 depicts a method 30 for oxidizing a fuel. The fuel is oxidized by providing a fuel to be oxidized, and a catalyst mixture of the invention (step 32), mixing catalyst particles with combustion air (step 34), mixing the catalyst-containing air with the fuel (step 36) and oxidizing the fuel (step 38). As discussed previously, the catalyst may be transported from the catalyst mixture to the flame zone (step 34) by a sparging gas stream to a combustion air intake to the flame zone, may be directly injected into the combustion air intake to the flame zone, or may be directly injected into the flame zone. The fuel may be transported to the flame zone by any method known and used in the art including, without limitation, direct injection. The various catalyst particles may alternatively be placed into the combustion air separately by separate sparging processes or injection.

Catalysts for mixing with fuel in a fuel tank, also called fuel additives, have a tendency to settle out of the fuel over time and collect on the bottom of the fuel tank. Additionally, when catalysts are mixed with the fuel prior to being mixed with the combustion air, the catalyst particles attach to the fuel. For liquid fuels, even after the fuel is vaporized (also conventionally called "atomized"), the fuel shields most if not all of the catalyst particles from catalyzing the combustion air if the liquid fuel and catalyst are pre-mixed. The catalyst mixtures of the present invention are not to be confused with fuel additives. By mixing the fluidized catalyst particles with the combustion air before the fuel is added, the catalyst particles are able to catalyze the combustion air for the oxidation process. By catalyzing the combustion air prior to mixing it with fuel, the catalysts are excited and thus more active than when pre-mixed with liquid fuel. Accordingly, the catalysts further accelerate the separation of oxygen in the combustion air. The catalyst-containing combustion air within the environment of the flame zone is, therefore, catalyzed before combustion which enhances the oxidation of the fuel more fully than when the catalyst is merely mixed with the fuel in liquid form. When the catalyst particles subsequently mix with the fuel for oxidation, they also catalyze the fuel. Catalyst mixed directly into liquid fuel has very little, if any, opportunity to catalyze the flame zone environment prior to oxidation of the fuel.

As explained previously, it is believed that mixing a group III or group IIA element, particularly Aluminum or Magnesium, with the combustion air prior to mixing the combustion air with the fuel creates a more conductive environment for oxidation. It is further believed that having a more conductive environment during oxidation enables the oxidation of the fuel to occur more quickly because electrons associated with the oxidation process can travel more quickly. However, actual burn time may be increased due to the fuel oxidizing more completely. In many oxidation processes, such as, for example, a diesel reciprocating engine, some of the fuel is not completely oxidized in the combustion chamber. This results in greater harmful emissions from the diesel engine. By accelerating the oxidation process or extending its duration, more of the fuel is burned and harmful emissions are reduced.

EXAMPLE 1

Referring to FIG. 3, a gasoline fuel may be oxidized in accordance with the method and composition disclosed herein. The current Example relates to a gasoline fuel engine having a fuel consumption rate of 5 gallons per hour operating for at least 400 hours, thereby consuming approximately two thousand (2,000) gallons (6056 kilograms) of fuel. A typical car consumes approximately 5 gallons/hour. The engine is provided with a catalyst delivery system as shown in FIG. 1. The specific catalyst mixture for a fuel rate of 5 gal/hour for this Example is as follows:

To one (1) liter of water was added:
  2.4 g (2.4 milligrams/milliliter, mg/ml) $H_2PtCl_6.6H_2O$ (chloroplatinic acid)
  0.4 g (0.4 mg/ml) $HReO_4$ (perrhenic acid)
  0.28 g (0.28 mg/ml) $RhCl_3$
  0.28 g (0.28 mg/ml) $AlCl_3$.

The catalyst chamber 15 of the delivery system is charged with thirty six (36) mil of this catalyst mixture, and with enough of a base liquid comprising equal parts ethylene glycol and water and 5400 parts per million (ppm) by weight LiCl (collectively "combined catalyst mixture"), for a total of 650 ml of combined catalyst mixture in the catalyst chamber. The pH of the combined catalyst mixture was adjusted to a range between 1.6 and 2.4 by dropwise addition of a dilute solution of hydrochloric acid in water.

At a fuel consumption rate of approximately 5 gallons/hour, 36 ml of catalyst mixture in 650 ml of combined catalyst mixture may be sparged for a period of at least 400 hrs. at a bubble rate of between about 4–6 bubbles per second and still be effective. The sparged air of the present Example which contains catalyst particles is placed into the air intake of the combustion chamber of the gasoline engine.

The concentration of catalyst mixture in the combined catalyst mixture may be adjusted for engines having higher fuel consumption rates so that the combined catalyst mixture of 650 ml includes approximately 36 ml of catalyst mixture for each 5 gal/hour of fuel consumption. Accordingly, the catalyst mixture may be produced, sold and distributed separately from the base liquid, and added to the base liquid in the catalyst chamber as needed by an end user such as a car owner. Test results indicate that when there is more than approximately 160 ml of catalyst mixture in the combined catalyst mixture of 650 ml, the benefits of adding more catalyst are reduced. In cases with engines consuming more than approximately 22.5 gal/hour of fuel, more than one liquid catalyst dispenser may be needed for full effectiveness. Test results also indicate that adding more Aluminum to the catalyst mixture, even doubling it to 0.56 mg/ml, provides better performance results than with less Aluminum. Nevertheless, even in engines using a catalyst mixture with relatively small amounts of Aluminum performed better than without any Aluminum.

It has been found that engines using a combined catalyst mixture as described above experienced a greater than 50% reduction in NOx, hydrocarbon and carbon monoxide emissions. While it was not directly tested, it is also believed that SOx emissions were reduced due to efficiency increases.

Changing the chemistry of the flame zone environment through the use of catalyst mixtures of the invention may affect the chemistry of the interactions and oxidations of the various fuel and catalyst elements, and may even alter the oxidizing temperature of the fuel. Studies by other researchers have indicated that plating a combustion chamber with Platinum reduced harmful emissions and reduced cyclonic temperatures of the combustion gases from approximately 330° C. to approximately 220° C. Reduced cyclonic temperatures of the combustion gases is believed to further extend the burn time of the combustion process.

EXAMPLE 2

The following specific tests were performed on a single Catepillar Model No. 3408 Series Diesel Engine using a combined catalyst mixture comprising 144 ml of a mixture of water, 2.4 mg/ml $H_2PtCl_6.6H_2O$, 0.4 mg/ml $HReO_4$, 0.28 mg/ml $RhCl_3$, and 0.28 mg/mi $AlCl_3$, and a liquid comprising equal parts ethylene glycol and water and 5400 ppm by weight LiCl to bring the total of the combined catalyst mixture to 650 ml in the catalyst chamber. Using the same sparging process described in Example 1, the catalyst particles were carried to the combustion chamber. Unless otherwise indicated, the engine was running under an 85% load. Under the description provided in Example 1, 144 ml of catalyst mixture is sufficient for about 20 gal/hour of fuel consumption. Under 85% load, the Catepillar engine ordinarily consumes approximately 23 gal/hour. Thus, the catalyst mixture was run lean for these tests. The tests discussed are standardized industry tests performed on appropriate calibrated equipment and will be clear to those of ordinary skill in the art.

Horsepower

Using a water brake engine dynamometer, the horsepower (Hp) of the engine was measured without the addition of catalyst to the combustion chamber and found to be about 447 Hp. When the catalyst was sparged from the catalyst mixture to the combustion chamber, the horsepower of the engine was found to be 520 Hp. This reflects a 16.3% increase in horsepower (Hp) through the use of a catalyst mixture of the invention as compared to operating the same engine under the same conditions without the addition of catalyst into the engine combustion chamber.

Harmful Emissions

Using various standard harmful emissions detectors, it was found that a 79% reduction in opacity, a 60% reduction in carbon monoxide and a 66% reduction in hydrocarbons in the exhaust from the engine resulted when catalyst was sparged from the catalyst mixture into the engine combustion chamber as compared to the same engine operated under the same conditions without sparging the addition of catalyst into the engine combustion chamber.

It is believed that the use of a sparged catalyst mixture results in the catalyst particles being attracted to metallic surfaces of the engine and exhaust causing a temporary thin catalyst coating to form, for example, on the inner walls of the combustion chamber. This may contribute to extending the benefits of the catalyst beyond the time where the catalyst is being actively delivered. It is therefore believed that the delivery of the catalyst could be cycled on and off periodically during engine operation with similar benefits, while using lesser amounts of the catalyst composition.

Torsional Vibration

An electronic inductive pickup (tachometer sensor) of a CSI 2120A Machine Analyzer was used to measure torsional vibration.

Table 1 reflects the engine's torsional vibration without catalyst being sparged from the catalyst mixture into the engine, and the torsional vibration of the engine with catalyst being sparged into the engine. In Table 1, "Overall (G-DG)" is the difference in degrees between measurements, "RMS" is the root mean square of the relative average degree of change of all measurements, "Load" indicates that the engines were operating at 100% load, "RPM" is revolutions per minute, and "RPS" is revolutions per second. As demonstrated in Table 1, under the same conditions but with the use of the catalyst of the present invention within the combustion chamber, the Overall (G-DG) and RMS decreased, and the RPS increased by a full rotation.

TABLE 1

Summary of Torsional Vibration - Static State

|  | Without Catalyst | With Catalyst |
| --- | --- | --- |
| Overall (G-DG) | 0.1099 degrees | 0.1022 degrees |
| RMS | 0.1093 degrees | 0.1018 degrees |
| Load | 100% | 100% |
| RPM | 2055 | 2115 |
| RPS | 34.25 | 35.26 |

Table 2 reflects the change in the engine's torsional vibration for the harmonics of the engine's vibration with the addition of catalyst particles to the combustion air intake stream.

TABLE 2

Summary of Torsional Vibration Harmonics

| Harmonics | % Change |
|---|---|
| 0.50 | −27 |
| 1.50 | −21 |
| 2.00 | −23 |
| 2.50 | −5 |
| 3.00 | −27 |
| 3.50 | −24 |
| 4.00 | −24 |
| 4.50 | −6 |
| 5.00 | −5 |
| 5.50 | 7 |

With less vibration and a faster engine, more of the energy of the fuel oxidation is returned to the engine as power rather than as vibration. Reductions in the torsion or a dynamic torque of the engine means that the engine is running smoother and that there is less strain on the rod bearings and main bearings, resulting in a longer engine life.

Ultra-Sonic Energy

The ultra-sonic energy of the engine was measured using an specific accelerometer of a CSI 2120A Machine Analyzer.

Table 3 reflects the ultra-sonic energy of the engine without catalyst being sparged from the catalyst mixture into the engine, and the ultra-sonic energy of the engine with catalyst being sparged into the engine. In Table 3, "RMS" is the root mean square of the ultra-sonic wave form, "Load" indicates that the engines were operating at 100% load, "RPM" is revolutions per minute, "RPS" is revolutions per second, PK(+) and PK(−) represent, respectively, the positive and negative peaks of the vibrations in standard units, and "CrestF" is the ratio between the average and the peak value.

TABLE 3

Summary of Ultra-sonic Energy

| | Without Catalyst | With Catalyst |
|---|---|---|
| RMS | 6.64 | 7.10 |
| Load | 100% | 100% |
| RPM | 2073 | 2116 |
| RPS | 34.55 | 35.26 |
| PK (+) | 21.42 | 26.33 |
| PK (−) | 17.37 | 19.28 |
| Total (PK(+) + PK(−)) | 38.79 | 45.61 |
| CrestF | 3.23 | 3.7 |

The ultra-sonic energy of a reciprocating engine is an indicator of the power and smoothness of the engine. When the ultra-sonic energy increases, this is an indication that the fuel combustion is more powerful and more even. More powerful may mean the power impulse is either stronger or longer. Accordingly, the tests indicate approximately a 3.3 dB or 8.13% increase in the ultra-sonic energy (when averaged over cylinders 1, 3, 5, and 7) of the engine through the use of catalyst within the combustion air as compared to no catalyst in the combustion air.

The foregoing embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations that may be apparent to a person skilled in the art are intended to be included within the scope of this invention as defined by the accompanying claims.

What is claimed is:

1. A method for oxidizing a fuel, comprising:
   providing a catalyst mixture including at least a concentration of at least about 0.07 mg/ml of Al as $AlCl_3$, and a concentration of at least about 0.1 mg/ml of Re as perrhenic acid, a concentration of at least about 0.07 mg/ml of Rh as $RhCl_3$, a concentration of at least about 0.28 mg/ml of Pt as $H_2PtCl_6H_2O$;
   mixing a portion of the catalyst mixture with combustion air prior to mixing the catalyst mixture with a fuel to be oxidized; and
   oxidizing the fuel.

2. The method of claim 1, further comprising adding a liquid to the catalyst mixture before mixing it with the combustion air.

3. The method of claim 2, wherein the liquid comprises one or more liquids selected from the group consisting of ethylene glycol and water.

4. The method of claim 3, wherein the liquid further comprises lithium chloride.

5. The method of claim 2, wherein the liquid further comprises a surfactant.

6. The method of claim 1, further comprising sparging a gas through the catalyst mixture to generate fluidized catalyst particles to mix with the combustion air.

7. The method of claim 6, further comprising ionizing the sparging gas prior to sparging it through the catalyst mixture.

8. The method of claim 6, wherein the sparging gas is selected from the group consisting of air, helium, nitrogen, argon, and combinations thereof.

9. The method of claim 1, wherein the catalyst mixture further comprises one or more of manganese, iron, magnesium and molybdenum.

10. The method of claim 1, wherein oxidizing the fuel comprises oxidizing the fuel in an open flame.

11. The method of claim 1, wherein oxidizing the fuel comprises oxidizing the fuel in an enclosed flame.

12. The method of claim 1, wherein oxidizing the fuel comprises oxidizing gasoline.

13. The method of claim 1, wherein oxidizing the fuel comprises oxidizing diesel fuel.

14. The method of claim 1, wherein oxidizing the fuel comprises oxidizing a fuel selected from the group consisting of number 2 fuel oil, fuel oil refined from crude oil, diesel fuel, gasoline, compressed or liquified natural gas, gasohol, any hydrocarbon having one or more carbon atoms such as methane, ethane, propane, butane, isobutane, toluene, xylene, octane, benzene, mixtures of alcohols having methanol, ethanol, propanol, butanol, isopropanol, isobutanol, pentanol, hexanol, heptanol, octanol and combinations thereof, vegetable oil such as corn oil, mineral oil, coal, coal gas, asphalt vapor, oxidizable vapors from chemical processes, wood, paper and combinations thereof.

15. The method of claim 1, wherein oxidizing the fuel comprises oxidizing within a combustion chamber of a reciprocating engine selected from the group consisting of a gasoline fuel engine and a diesel fuel engine.

16. The method of claim 1, wherein oxidizing the fuel comprises oxidizing the fuel within a combustion chamber of a reciprocating engine, wherein the fuel is selected from the group consisting of number 2 fuel oil, fuel oil refined from crude oil, diesel fuel, gasoline, compressed or liquified natural gas, gasohol, any hydrocarbon having one or more carbon atoms such as methane, ethane, propane, butane, isobutane, toluene, xylene, octane, benzene, mixtures of alcohols having methanol, ethanol, propanol, butanol, isopropanol, isobutanol, pentanol, hexanol, heptanol, octanol and combinations thereof, vegetable oil such as corn oil, mineral oil, coal, coal gas, asphalt vapor, oxidizable vapors from chemical processes, wood, paper and combinations thereof.

17. The method of claim 1, wherein oxidizing the fuel comprises oxidizing within a flame zone of an apparatus selected from the group consisting of a furnace, a boiler and an incinerator.

18. The method of claim 1, wherein oxidizing the fuel further comprises oxidizing within an apparatus selected from the group consisting of an incinerator, a vent gas burner, a furnace, a steam turbine and combinations thereof.

19. The method of claim 1, wherein providing the catalyst mixture further comprises providing the catalyst mixture having a pH of less than about 4.0.

20. The method of claim 19, wherein providing the catalyst mixture further comprises providing the catalyst mixture having a pH of between about 1.4 and about 3.0.

21. The method of claim 20, wherein providing the catalyst mixture further comprises providing the catalyst mixture having a pH of between about 1.6 and about 2.2.

22. The method of claim 1, wherein the catalyst mixture further comprises a surfactant.

23. The method of claim 22, wherein the ratio of Pt to Rh in the mixture is about 8.6 to 1, the ratio of Pt to Re in the mixture is about 6 to 1, and the ratio of Pt to Al in the mixture is about 8.6 to 1.

24. The method of claim 1, wherein mixing a portion of the catalyst with the combustion air comprises transporting the catalyst particles to a combustion air intake to the flame zone and mixing the catalyst with the combustion air within the air intake.

25. The method of claim 1, wherein a ratio of Pt to Rh in the mixture is between about 15 to 1 and about 4 to 1, a ratio of Pt to Re in the mixture is between about 15 to 1 and about 2 to 1, and a ratio of Pt to Al in the mixture is between about 15 to 1 and about 2 to 1.

26. A method for oxidizing a fuel, comprising:
providing a catalyst mixture including at least a concentration of at least about 0.07 mg/ml of Mg as $MgCl_2$, and a concentration of at least about 0.1 mg/ml of Re as perrhenic acid, a concentration of at least about 0.07 mg/ml of Rh as $RhCl_3$, a concentration of at least about 0.28 mg/ml of Pt as $H_2PtCl_6.6H_2O$, and combinations thereof;
mixing a portion of the catalyst mixture with combustion air prior to mixing the catalyst mixture with a fuel to be oxidized; and
oxidizing the fuel.

27. The method of claim 26, further comprising adding a liquid to the catalyst mixture before mixing it with the combustion air.

28. The method of claim 27, wherein the liquid comprises one or more liquids selected from the group consisting of ethylene glycol and water.

29. The method of claim 28, wherein the liquid further comprises lithium chloride.

30. The method of claim 27, wherein the liquid further comprises a surfactant.

31. The method of claim 26, further comprising sparging a gas through the catalyst mixture to generate fluidized catalyst particles to mix with the combustion air.

32. The method of claim 31, further comprising ionizing the sparging gas prior to sparging it through the catalyst mixture.

33. The method of claim 31, wherein the sparging gas is selected from the group consisting of air, helium, nitrogen, argon, and combinations thereof.

34. The method of claim 26, wherein the catalyst mixture further comprises one or more of manganese, iron, and molybdenum.

35. The method of claim 26, wherein oxidizing the fuel comprises oxidizing the fuel in an open flame.

36. The method of claim 26, wherein oxidizing the fuel comprises oxidizing the fuel in an enclosed flame.

37. The method of claim 26, wherein oxidizing the fuel comprises oxidizing gasoline.

38. The method of claim 26, wherein oxidizing the fuel comprises oxidizing diesel fuel.

39. The method of claim 26, wherein oxidizing the fuel comprises oxidizing a fuel selected from the group consisting of number 2 fuel oil, fuel oil refined from crude oil, diesel fuel, gasoline, compressed or liquified natural gas, gasohol, any hydrocarbon having one or more carbon atoms such as methane, ethane, propane, butane, isobutane, toluene, xylene, octane, benzene, mixtures of alcohols having methanol, ethanol, propanol, butanol, isopropanol, isobutanol, pentanol, hexanol, heptanol, octanol and combinations thereof, vegetable oil such as corn oil, mineral oil, coal, coal gas, asphalt vapor, oxidizable vapors from chemical processes, wood, paper and combinations thereof.

40. The method of claim 26, wherein oxidizing the fuel comprises oxidizing within a combustion chamber of a reciprocating engine selected from the group consisting of a gasoline fuel engine and a diesel fuel engine.

41. The method of claim 26, wherein oxidizing the fuel comprises oxidizing the fuel within a combustion chamber of a reciprocating engine, wherein the fuel is selected from the group consisting of number 2 fuel oil, fuel oil refined from crude oil, diesel fuel, gasoline, compressed or liquified natural gas, gasohol, any hydrocarbon having one or more carbon atoms such as methane, ethane, propane, butane, isobutane, toluene, xylene, octane, benzene, mixtures of alcohols having methanol, ethanol, propanol, butanol, isopropanol, isobutanol, pentanol, hexanol, heptanol, octanol and combinations thereof, vegetable oil such as corn oil, mineral oil, coal, coal gas, asphalt vapor, oxidizable vapors from chemical processes, wood, paper and combinations thereof.

42. The method of claim 26, wherein oxidizing the fuel comprises oxidizing within a flame zone of an apparatus selected from the group consisting of a furnace, a boiler and an incinerator.

43. The method of claim 26, wherein oxidizing the fuel further comprises oxidizing within an apparatus selected from the group consisting of an incinerator, a vent gas burner, a furnace, a steam turbine and combinations thereof.

44. The method of claim 26, wherein providing the catalyst mixture further comprises providing the catalyst mixture having a pH of less than about 4.0.

45. The method of claim 44, wherein providing the catalyst mixture further comprises providing the catalyst mixture having a pH of between about 1.4 and about 3.0.

46. The method of claim 45, wherein providing the catalyst mixture further comprises providing the catalyst mixture having a pH of between about 1.6 and about 2.2.

47. The method of claim 26, wherein the catalyst mixture further comprises a surfactant.

48. The method of claim 47, wherein the ratio of Pt to Rh in the mixture is about 8.6 to 1, the ratio of Pt to Re in the mixture is about 6 to 1, and the ratio of Pt to Mg in the mixture is about 8.6 to 1.

49. The method of claim 26, wherein mixing a portion of the catalyst with the combustion air comprises transporting the catalyst particles to a combustion air intake to the flame zone and mixing the catalyst with the combustion air within the air intake.

50. The method of claim 26, wherein a ratio of Pt to Rh in the mixture is between about 15 to 1 and about 4 to 1, a ratio of Pt to Re in the mixture is between about 15 to 1 and about 2 to 1, and a ratio of Pt to Mg in the mixture is between about 15 to 1 and about 2 to 1.

* * * * *

UNITED STATES PATENT AND TRADEMARK OFFICE
CERTIFICATE OF CORRECTION

PATENT NO. : 6,776,606 B2 Page 1 of 1
APPLICATION NO. : 10/087139
DATED : August 17, 2004
INVENTOR(S) : Haskew

It is certified that error appears in the above-identified patent and that said Letters Patent is hereby corrected as shown below:

ON THE TITLE PAGE
PLEASE DELETE ITEM (73)

ON THE TITLE PAGE
ITEM (54) SHOULD READ CATALYST COMPOSITION AND METHOD OXIDIZING MIXTURES

Signed and Sealed this

Sixteenth Day of October, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,776,606 B2 | Page 1 of 1 |
| APPLICATION NO. | : 10/087139 | |
| DATED | : August 17, 2004 | |
| INVENTOR(S) | : Haskew | |

It is certified that error appears in the above-identified patent and that said Letters Patent is hereby corrected as shown below:

ON THE TITLE PAGE
PLEASE DELETE ITEM (73)

ON THE TITLE PAGE
ITEM (54) SHOULD READ CATALYST COMPOSITION AND METHOD FOR OXIDIZING MIXTURES

This certificate supersedes Certificate of Correction issued October 16, 2007.

Signed and Sealed this

Twenty-seventh Day of November, 2007

JON W. DUDAS
*Director of the United States Patent and Trademark Office*